(No Model.)

G. A. TWELE.
Rolling Pin.

No. 241,253.    Patented May 10, 1881.

WITNESSES:
E. Laass
F. H. Livingston

INVENTOR:
George A. Twele
per Duell, Laass & Hey
attorneys

UNITED STATES PATENT OFFICE.

GEORGE A. TWELE, OF NEW YORK, N. Y., ASSIGNOR OF ONE-HALF TO HENRY C. TWELE, OF SAME PLACE.

ROLLING-PIN.

SPECIFICATION forming part of Letters Patent No. 241,253, dated May 10, 1881.

Application filed May 10, 1880. (No model.)

*To all whom it may concern:*

Be it known that I, GEORGE A. TWELE, of New York, in the county of New York, in the State of New York, have invented new and useful Improvements in Rolling-Pins, of which the following, taken in connection with the accompanying drawings, is a full, clear, and exact description.

The nature of this invention consists in a peculiar form of a handle and its connection with the rolling-pin, whereby a cheap, simple, and convenient article is obtained, which can be operated by one or both hands.

Figure 1:
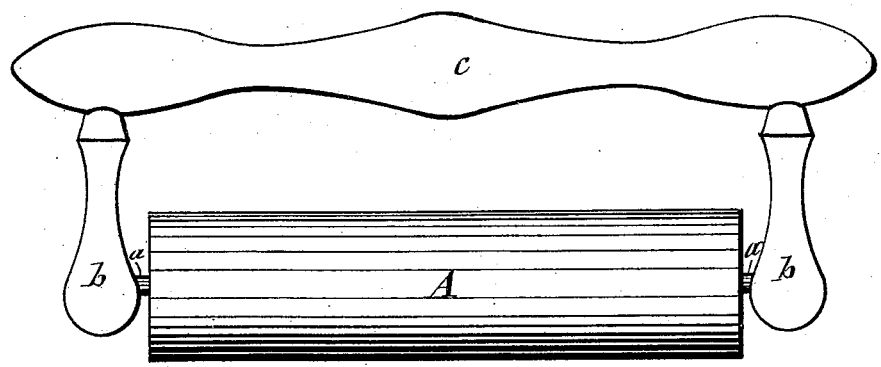
Figure 2:
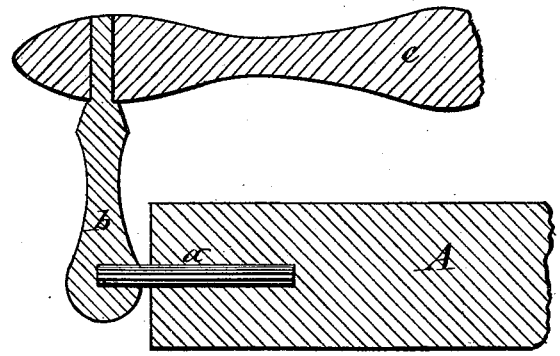
Figure 3:
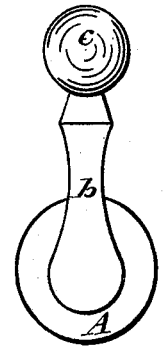

This invention is fully illustrated in the accompanying drawings, wherein Figure 1 is a front view of my improved rolling-pin; Fig. 2, a longitudinal section of one end thereof, and Fig. 3 an end view of same.

Similar letters of reference indicate corresponding parts.

A represents the roller, of the usual form. It is provided in the center of each end with a pintle or gudgeon, $a$, by which it is pivoted to arms $b\ b$, standing at right angles to the axis of the roller. Said arms project from a single handle, $c$, in the form of a bar, extended the length of the roller and parallel therewith. The said extension of the handle allows the implement to be operated with one as well as both hands, the pressure being invariably applied directly over the roller and transmitted to opposite ends thereof by the single handle and its arms $b\ b$.

In putting up the device for use the pintles are inserted in the roller. The arms $b$ are then placed upon the pintles and the handle secured on said arms. The holes in the arms $b$ being bored only partially through, the pintles cannot be lost, even though they are or become loose in the roller, said arms being always held in the same relation to the pintle and roller by means of their connection with the handle.

Having thus described my invention, what I claim as new, and desire to secure by Letters Patent, is—

The rolling-pin herein described, consisting of the roller A, provided with pintles $a$, the arms $b$, having holes bored partially through them to receive said pintles, and the handle C, provided with sockets to receive the upper ends of said arms $b$, all constructed and combined as and for the purpose specified.

In testimony whereof I have hereunto signed my name and affixed my seal, in the presence of two attesting witnesses, at the city of New York, in the county of New York and State of New York, this 5th day of May, 1880.

GEORGE A. TWELE. [L. S.]

Witnesses:
 MATTHEW J. DOLPHIN,
 DAVID M. HOLMES.